United States Patent [19]

Akamatsu

[11] 4,309,643
[45] Jan. 5, 1982

[54] DRIVING METHOD OF MOTOR FED BY ELECTRIC VALVE FEEDING APPARATUS AND THE SAME APPARATUS

[75] Inventor: Masahiko Akamatsu, Amagasaki, Japan

[73] Assignee: Mitsubishi Denki Kabushiki Kaisha, Tokyo, Japan

[21] Appl. No.: 104,532

[22] Filed: Dec. 17, 1979

Related U.S. Application Data

[63] Continuation-in-part of Ser. No. 862,959, Dec. 21, 1977, abandoned.

[30] Foreign Application Priority Data

Dec. 21, 1976 [JP] Japan .................... 51-154585

[51] Int. Cl.³ .................. H02K 29/00; H02P 7/00
[52] U.S. Cl. .................. 318/138; 318/714; 318/715; 318/721; 318/722; 318/723; 318/717; 318/254
[58] Field of Search ............. 318/714, 715, 721, 722, 318/723, 799, 800, 801, 802, 803, 806, 807, 808, 809, 810, 254, 138, 713, 717

[56] References Cited

U.S. PATENT DOCUMENTS

| | | | |
|---|---|---|---|
| 3,749,991 | 7/1973 | Kuniyoshi | 318/254 |
| 3,949,283 | 4/1976 | Okuyama et al. | 318/717 |
| 3,997,825 | 12/1976 | Miyasita et al. | 318/713 |
| 4,004,203 | 1/1977 | Chalmers et al. | 318/713 |
| 4,160,938 | 7/1979 | Akamatsu | 318/810 |

Primary Examiner—J. V. Truhe
Assistant Examiner—Eugene S. Indyk
Attorney, Agent, or Firm—Oblon, Fisher, Spivak, McClelland & Maier

[57] ABSTRACT

An AC motor having AC windings with an internal electromotive force is driven by an electric valve feeding apparatus having electric valves commutated by the internal electromotive force of the AC windings. The commutation of the electric valve is carried out under the condition of $U > \pi/m$ where m designates the number of commutation times per AC cycle of the electric valve feeding apparatus and U designates a commutation overlapping angle of the electric angle to feed the current to the AC windings whereby the motor is driven by the electric valve feeding apparatus.

31 Claims, 24 Drawing Figures

FIG. 1c (ii)

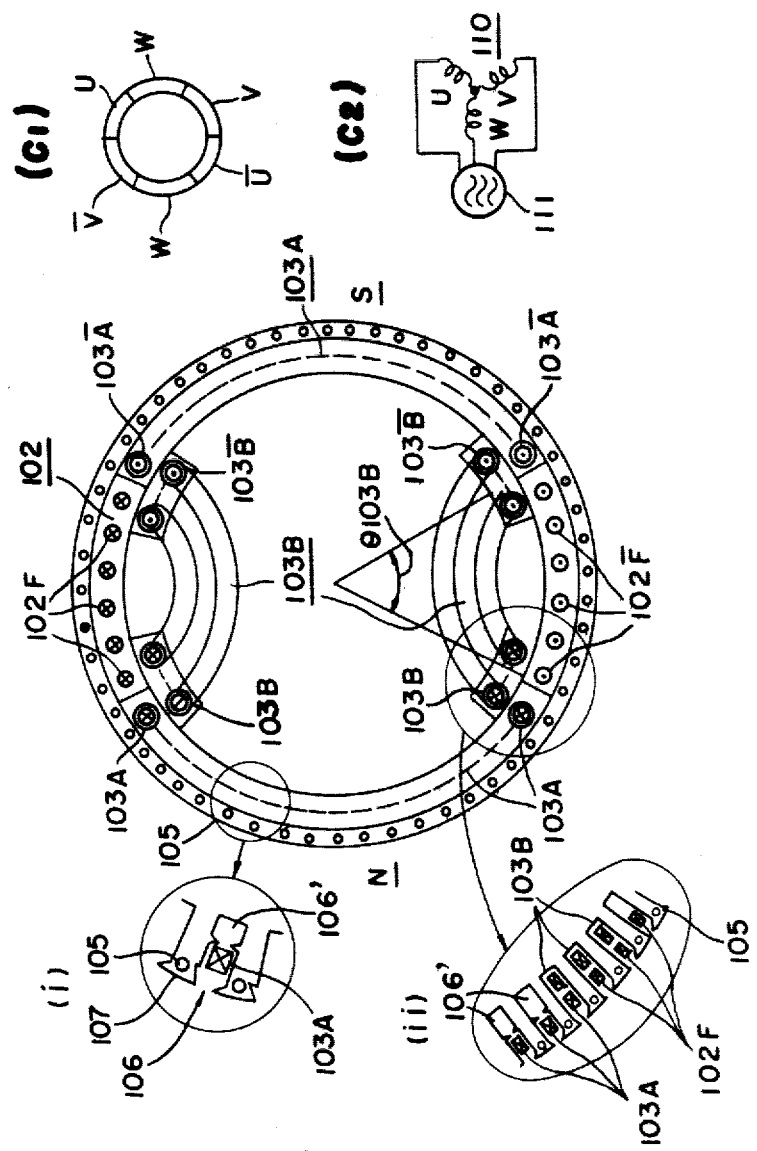

FIG. 2b
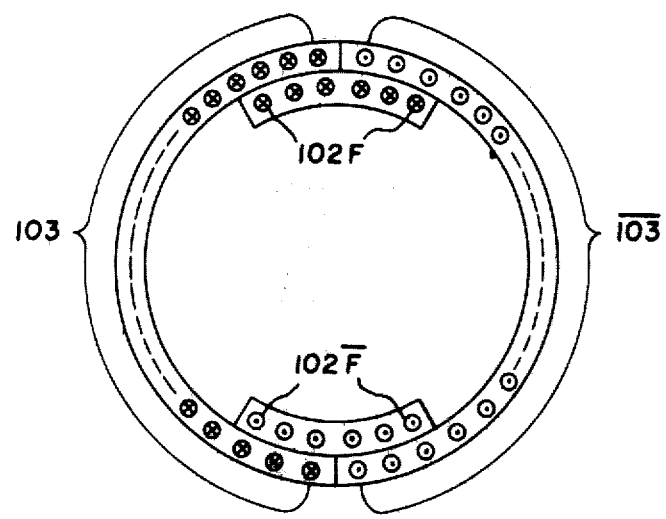
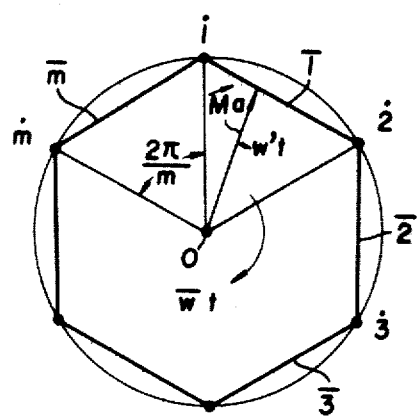
FIG. 3a
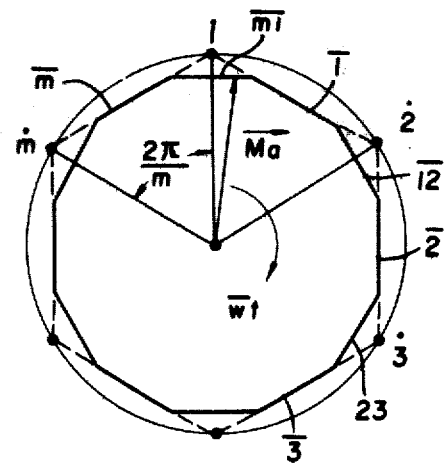
FIG. 3b

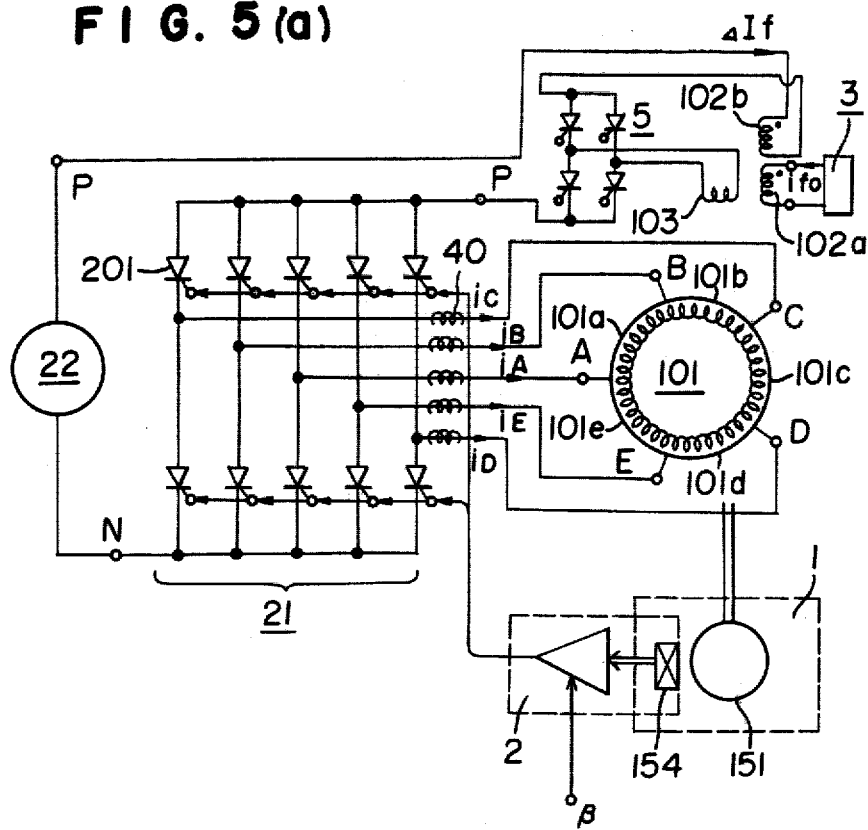
F I G. 5(a)

FIG. 6a
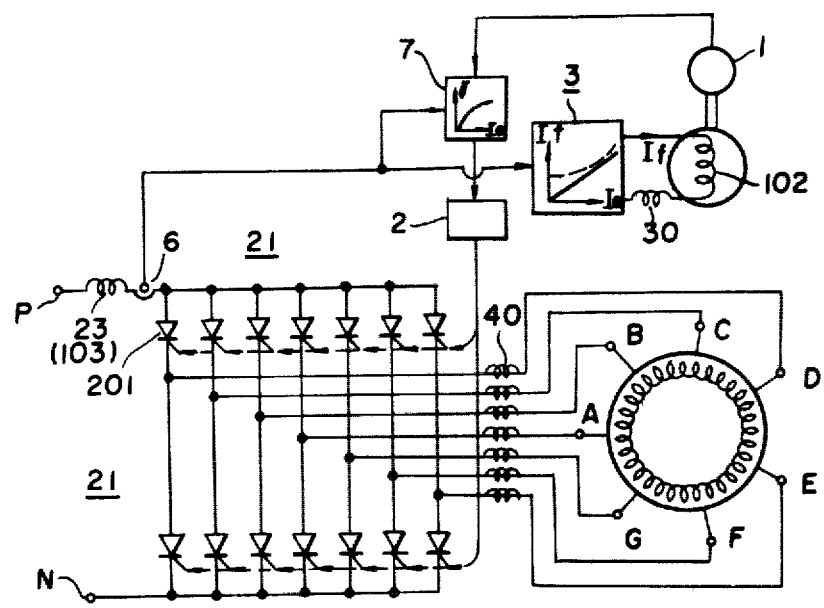
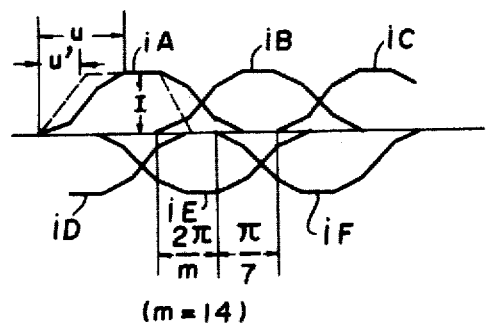
FIG.6b

4,309,643

DRIVING METHOD OF MOTOR FED BY ELECTRIC VALVE FEEDING APPARATUS AND THE SAME APPARATUS

BACKGROUND OF THE INVENTION

This application is a continuation-in-part of co-pending application Ser. No. 862,959, filed Dec. 21, 1977 now abandoned.

The present invention relates to a driving method of an AC motor fed by an electric valve feeding apparatus comprising electric valves commutated by the internal electomotive force induced in the AC windings of the motor.

The present invention also relates to a structure of windings of the motor and an electric valve feeding circuit being suitable for the driving method. The torque pulsations of the motor can be reduced and stable commutation of the electric valve feeding apparatus can be attained by the method and apparatus of the present invention.

The apparatus for feeding current through a three-phase electric value bridge (Graetz connection) having 6 electric valves to a group of three phase AC windings shown in FIG. 9 is known and used as an apparatus for driving a motor by an electric valve feeding apparatus commutated by the internal electromotive force of the motor.

In FIG. 9, the reference numerals (101R) to (101T) designate the AC windings (for example, the armature windings of a synchronous motor); (102) designates the exciting windings (for example, direct-axis field windings in a synchronous motor); (1) designates a distributor for obtaining signals synchronized to the internal counter electromotive force of the AC windings (101) (for example, a rotation position detector of a synchronous motor); (2) designates a turn-on control means for firing the electric valves (201) [①-⑥] of the electric valve circuit (21); (3) designates an excitation power source (for example, a DC excitor of a synchronous motor) for feeding exciting current to the exciting windings (102) (for example, the field current ($I_f$) of a synchronous motor); (22) designates a main power source (for example, DC power source when the electric valve circuit (21) is a DC-AC power converter).

The conventional electric valve feeding motor apparatus has the above-mentioned structure. The AC windings for one cycle ($2\pi$) are divided into six sections as shown in FIG. 10(a), and the currents for the phase $i_R$, $i_S$, $i_T$ are respectively fed in rectangular waveforms shown in FIG. 10(b) to (d). The symbols ① to ⑥ shown in each positive and negative half-wave of the currents for the phases show that the half-wave currents are fed through the electric valves ① to ⑥ of FIG. 9, wherein U designates a commutation overlapping angle and 1 designates a DC power source current value (AC current peak value).

In this conventional apparatus, the commutation is carried out six time per cycle.

The time interval between one commutation and the next commutation is an electrical angle of $2\pi/6$. In the internal electromotive force commutation type non-commutator motor, an effort has been made to decrease the overlapping angle in order to simplify commutation. For example, the driving operation has been carried out with an overlapping angle of about 10°.

However, as a result, the locus of the rotating counter electromotive force Ma caused by the AC windings (101R)–(101T) suddenly jumps during the time ($t_u = u/w$) corresponding to the commutation overlapping section U between the top points 1 to 6 of the hexagon in FIG. 3(a). Accordingly, the angle between the axis of the magnetic flux (direct-axis) formed by the direct-axis field windings (102) and the axis of the rotating electromotive force Ma is suddenly changed and the angle is returned to its original value depending upon the rotation of the motor. The operation is repeated for each commutation whereby the torque pulsations have been increased disadvantageously.

In the conventional apparatus, the overlapping angle U is varied depending upon the load, and the phase and absolute value of the internal electromotive force are varied by the reaction of the armature of the motor, whereby the reverse bias period (allowance angle $\gamma$) required for turning off the electric valve is suddenly varied and the range of stable operation of the electric valve feeding circuit is narrowed disadvantageously.

This fact will be illustrated referring to FIG. 11, which shows the case of the commutation between the R phase and the S phase.

The commutation is initiated at the turn-on angle $\beta$ (firing angle) to the internal reverse electromotive force shown in FIG. 11(a)(i), whereby the current $i_R$ for the R phase is reduced between the overlapping angle U as shown in FIG. 11(a)(ii) and the current $i_S$ for the S phase is increased.

The positive voltage period of the internal reverse electromotive force $Ea_{(RS)}$ (negative voltage period to the electric valve in the reduction of current) after the overlapping (after commutation) is the reverse bias period (allowance angle $\gamma$). On the other hand, the vectors on the AC windings of the synchronous motor are shown in FIG. 11(b). That is, the composite internal electromotive force Ea (electromotive force corresponding to the practical magnetic flux) is the sum of the component of the internal electromotive force caused by the field current $I_f$ and the reactance voltage $jX_aI_a$ for reaction caused by the armature current $I_a$. In this case, the phase difference $\Delta\beta$ is caused and the absolute value of the electromotive force is small. Accordingly, when the operation is continued under the turnon phase $\beta_f$ given by the distributor (1), the turn-on angle $\beta$ to the composite internal electromotive force Ea is varied (see FIG. 1(a)(6)).

Because of the above-mentioned operation, the turn-on angle $\beta$ and the overlapping angle U to the load current I corresponding to the torque are varied as the curves shown in FIG. 11(c). The allowance angle $\gamma$ as the difference is suddenly decreased depending upon the increase of the load current. The point Cl is the commutation critical point. In this case, the area of the shading part of FIG. 11(a) is proportional to a product of the commutation inductance $l_c$ and the current I and the turn-on angle $\beta$ is decreased whereby the overlapping angle U is remarkably increased.

As a result, in the conventional apparatus, it has been considered to decrease the overlapping angle U (to decrease the commutation inductance) as far as possible, and the allowance angle $\gamma$ and the overlapping angle U have not been easily stabilized.

SUMMARY OF THE INVENTION

It is an object of the present invention to overcome the disadvantages of the conventional apparatus and to provide a novel method of reducing the torque pulsations for a motor fed by an electric valve feeding apparatus.

It is another object of the present invention to provide various apparatuses for stabilizing this commutation by the method.

It is the other object of the present invention to provide a novel method of driving an AC motor by an electric valve feeding apparatus comprising electric valves such as thyristors commutated by the internal electromotive force of the motor.

It is the object of the present invention to provide an electric valve feeding motor apparatus by the novel driving method.

The method of the present invention is to drive the apparatus under the condition of $U > 2\pi/m$ wherein m designates the number of commutation times per AC cycle of the electric valve circuit and U designates an overlapping angle of the electric valve whereby the torque pulsation of a motor can be remarkably reduced.

The present invention is to provide structures of various exciters which attain stable commutation in operation under a large overlapping angle of more than $2\pi/m$ and the circuit system thereof.

The exciter comprises direct-axis field windings and quadrature-axis field windings wherein the exciting current corresponding to the current passed through the AC windings is fed to the quadrature-axis field windings and the direct-axis field windings are excited by DC current.

Various objects, features and advantages of the present invention will be more fully appreciated from the following detailed description of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1(*b*) shows waveforms in the operation of one embodiment of the present invention;

FIG. 1(*c*) shows relationships of phases of the AC windings of FIG. 1(*a*);

FIGS. 2(*a*), (*b*) are respectively sectional views showing the distribution of conductive elements of exciting means of a synchronous machine for stable driving in the present invention;

FIG. 2 (C₁, C₂) is a schematic view of suitable wound-rotor type induction machine for stable driving in the present invention;

FIGS. 3(*a*), (*b*) are diagrams for illustrating the function and result of the present invention;

FIGS. 5 to 7 are respectively the circuit diagrams and the waveforms in the operations of the other embodiments;

FIG. 12(*b*) shows a waveform of a field electromotive force for one phase obtained by the apparatus of the present invention.

DETAILED DESCRIPTION OF THE PREFERRED EMBODIMENTS

Figure 1A:
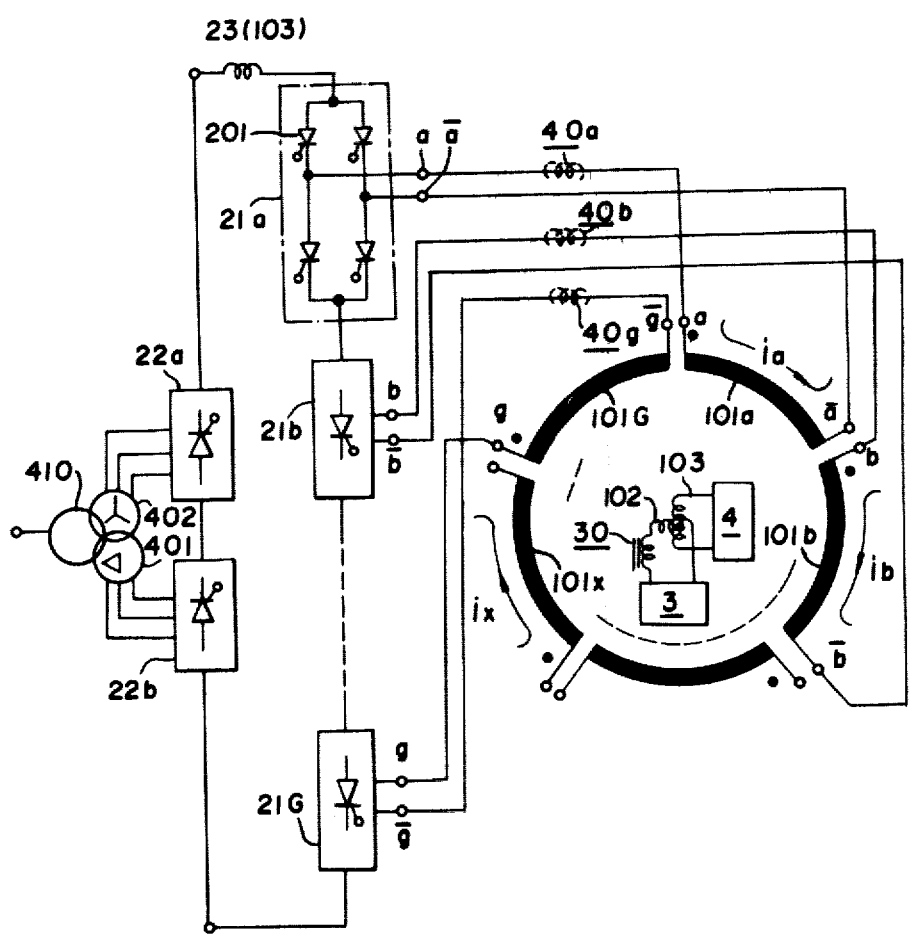
FIG. 1(*a*) is a circuit connection of one embodiment of the present invention.

Referring now to the drawings, the embodiment of FIG. 1(*a*) will be described.

In FIG. 1(*a*), the reference numerals (101*a*) to (101*g*) designate G phase AC windings; (102) designates direct-axis field windings; (103) designates quadrature-axis field windings; (3) designates a direct-axis exciting power source: (4) designates a quadrature-axis exciting power source.

The preferred embodiments of the direct-axis field windings (102) and the quadrature-axis field windings (103) are shown in FIG. 2(*a*), (*b*). The details will be described later. The reference numerals (21*a*) to (21*g*) designate single phase inverter units for G groups which are connected to the AC terminals (a, $\bar{a}$ to g, $\bar{g}$) of the AC windings for phases (101*a*) to (101*g*). The DC terminals of the inverter units (21*a*) to (21*g*) are advantageously connected in series because the DC voltage pulsation between the total DC terminals is small and it is suitable for high voltage and large capacity.

The reference numeral (23) designates a DC reactor which need not be used when the numbers of phases G are large or the compensation windings (103) are connected in series in the DC circuit.

The reference numerals (22*a*), (22*b*) designate rectifier units; (401), (402) designate secondary windings of a commutation transformer; (410) designates primary windings. The DC power source of a twelve phase rectifier is formed by the rectifier units and the commutation transformer.

In the electric valve feeding motor apparatus having the above-mentioned structure, the number of commutation times m per cycle is given as m=2G when the electric valves at the opposite sides for each of the single phase inverter units (21*a*) to (21*g*) are turned on in the same phase and the apparatus has each phase difference of $2\pi/G$ when the number of phases G is an odd number (FIG. 1(*c*)(*i*)) or the apparatus has each phase difference of $\pi/G$ when the number of phases G is an even number (FIG. 1(*c*)(*ii*)). The number of commutation times m per cycle is given as m-G when the apparatus has each phase difference of $\pi/G$ and the number of phases G is an even number (FIG. 1(*c*)(*i*) or (*ii*) having each pair of reverse phases) because the commutation is simultaneously caused for the AC windings in the reverse phases.

When the electric valves at the opposite positions in the single phase inverter unit are turned on while shifting the phase for about $\pi/2G$ (or $\pi/G$), twice the number of commutation times can be obtained.

FIG. 1(*b*) shows the current waveform of the AC windings in the embodiment of the present invention having the same phase turn-on at the opposite sides for each single phase inverter and each phase difference of $2\pi/G$ and the odd number of phases.

Figure 1B:
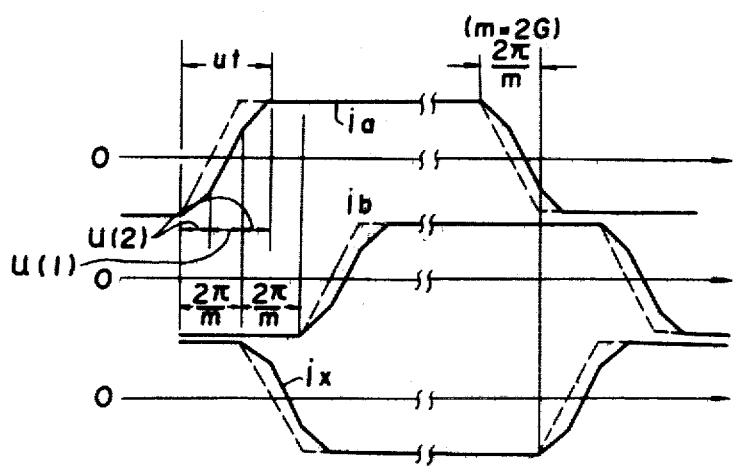

In FIG. 1(b), the reference $i_a$ designates the first phase current, $i_b$ designates the second phase current, and $i_x$ designates the xth phase current. The phase difference between the first phase and the second phase is $2\pi/G$ and the following phases each have respectively a phase difference of $2\pi/G$.

Figure 1C:
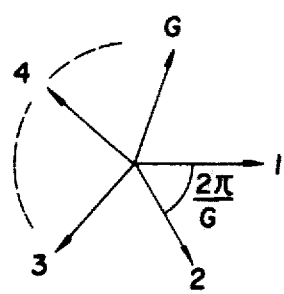
Figure 1B:
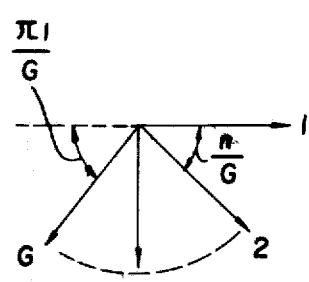

The xth phase is the even numbered phase in the nearest relation to the reverse phase to the first phase (the fourth phase in the case of the five phases of the embodiment having the phase difference of $2\pi/G$ in FIG. 1(c)(i)). The xth phase is commutated to the reverse polarity to the first phase after the first phase is commutated.

When the commutation overlapping angle $U_t$ is just $2\pi/m$, wherein m designates the number of commutation times per cycle, the waveform is shown by the dotted line. This is the critical condition for overlapping one commutation to the next commutation. When the commutation overlapping angle is given as the critical overlapping angle, the locus of revolution of the vector of the AC winding electromotive force generated by the multi-phase AC current, moves on the chord $\overline{1}$, $\overline{2}$, . . . $\overline{m}$ in FIG. 3(a). This is the critical condition whether it stops on the point 1 to m.

In the critical overlapping angle condition ($\overline{U}=2\pi/m$), it takes the time for $\overline{U}/\overline{\omega}=2\pi/\overline{\omega}m$ to shift from a vertex of the m angular shape to an adjacent vertex (the reference $\overline{\omega}$ designates average angle velocity). The required time $U/\overline{\omega}$ is the same as the commutation period $2\pi/\overline{\omega}m$ whereby the revolution of the electromotive force Ma is smooth whereby the torque pulsation is remarkably small.

In comparison with the conventional operation under $U<<2\pi/m$, it decreases to about $1\sim 2/m$ at the critical overlapping angle (the effect is higher depending upon larger commutation times). The instantaneous rotating velocity $\omega$ of the revolution electromotive force generated by the AC windings is substantially uniform (the pulsation of $\omega$ is small) near the critical overlapping angle (or more), whereby it is continuously rotated (non-stop) and the torque pulsation is constant and small regardless of the power-factor angle and the turn-on phase angle.

When the overlapping angle U is more than the critical overlapping angle ($U \geq 2\pi/m$) in operation, the AC winding current waveform is shown by the full line in FIG. 1(b) wherein a plurality of the phases are overlapped and the commutation is caused. The reference U(2) designates the overlapping region and U(1) designates the nonoverlapping region. In the operation, the locus of the rotating electromotive force caused by the AC windings is a 2m angular shaped path as shown in FIG. 3(b) whereby the locus does not pass on the original vertices $\overline{1}$, $\overline{2}$ to $\overline{m}$ and the angles are lost to pass overlapping chords $\overline{12}$, $\overline{23}$, to $\overline{m1}$. Accordingly, the torque pulsation is further reduced to substantially zero pulsation (less than 5% of the torque pulsation), even though m=6 (such as three phases). The torque pulsation is not substantially found in the case of m=8 (four phases of the phase relation of FIG. 1(c)(ii), each having a phase difference of 45° of the electric angle), or in the case of m=10 (five phases of the phase relation of FIG. 1(c)(i), each having a phase difference of 72° of the electric angle).

In the operation under a large overlapping angle, the single phase electric feeding unit system as the single phase inverter unit connection system or the single phase output cycloconverter unit system shown in FIG. 1 is remarkable effective.

In the single phase commutation circuit, the commutation is carried out for 2 times per cycle in the unit of the electric valve circuit. Accordingly, it is possible to obtain the OFF period if the commutation is completed during $\frac{1}{2}$ cycle whereby the maximum value of the allowance overlapping angle in each unit is remarkably large. That is, the failure of the commutation is not caused in the operation under a large overlapping angle. When a plurality of single phase units (21a) to (21g) as shown in FIG. 1(a) are used, the failure of the commutation can be prevented in the operation under the critical overlapping angle of more than $2\pi/m$.

It is also possible to use the single way type single phase inverter (half-wave current is passed through the half of each AC windings) which has the AC windings with the single phase middle taps (C middle tap in each phase) as well as the single phase bridge connection. In FIG. 8(b), when the neutral point of the motor AC windings (star connection) is connected to the neutral point of the AC power source, the cycloconverter for three phases components of the single phase output units can be obtained.

As described above, the present invention is to provide a novel method of driving an AC motor by means of an electric valve feeding apparatus under the condition of $U>2\pi/m$ wherein m designates the number of commutation times per cycle and U designates a commutation angle of the electric valve (electrical angle in the section from zero to the specific current or the section from the specific current to zero) whereby the torque pulsation of the motor can be reduced.

Various structures being suitable for the applications of the driving method of the present invention will be illustrated.

The five fundamental methods can be considered on the motor for the approach to the critical overlapping angle or excess (overlap commutation).

The first method is to have an exciting means being proportional to the AC current (a compensation winding; a direct winding field; commutation windings; or a wound-rotor type induction machine).

The second method is to increase the numbers of the phases (the approach condition is given by decreasing the critical overlapping angle).

The third method is to increase the armature leakage or to provide AC reactors (40a) to (40g) outside as shown in FIG. 1(a).

The fourth method is to increase the leakage of the direct-axis field (102) or to provide a DC reactor (30) outside.

The fifth method is to provide damper windings.

These structures will be illustrated.

FIGS. 2(a), (b) show one embodiment of suitable exciter for contributing to the stabilization of the commutation in the present invention.

FIGS. 2(a), (b) are respectively sectional views showing distributions of the sectional parts of the conducts of the exciting windings in the revolutional field rotor having two poles. The embodiment can be applied for the field stator.

In FIG. 2(a), the reference numerals (102F), (102$\overline{F}$) respectively designate direct-axis field conductor; (103A), (103$\overline{A}$) respectively designate the first quadrature-axis field conductor (compensation windings); (103B), (103$\overline{B}$) respectively designate the second quadrature-axis field conductor (commutation windings) and (105) designates a cage type damage conductor.

The partially enlarged view of the compensation windings is shown in FIG. 2(i), wherein the compensation windings (103A) are buried in the slots (106) and the damper conductors (105) are inserted into the holes at the top ends of the teeth and the space (106') in the slot deep part for the compensation windings (103A) can be used as holes for air path. Of course, it is possible to form shallow slots without the space.

The partially enlarged view of the boundary zones between the direct-axis field windings (102F), the compensation windings (103A) and the commutation windings (103B) is shown in FIG. 2(ii) wherein the commutation windings conductors (103B), (103B̄) are buried under the field conductors (102F), (102F̄) or under the compensation conductors (103A), (103Ā).

When the phases of the AC windings are many, the range of distribution for single split-phase windings can be narrow whereby the width of the commutation windings $\theta_{103B}$, i.e. the coil pitch $\theta_{103B}$, can be narrow depending upon the phase number of the AC windings.

In the embodiment, the commutation winding conductors (103B), (103B̄) can be buried in the slots of the field conductors (102F), (102F̄).

The other embodiments of the invention having equivalent function to the commutation windings (103B) of FIG. 2(a) are shown in FIG. 2(b) wherein the compensation winding conductors (103), (103̄), are distributed along substantially all or all of the circumferential part, and a part of the field conductors are buried and distributed in the rear side to the slot spaces. This embodiment corresponds to the embodiment of FIG. 2(a) except for exchanging the relations of the field conductors (102) and the commutation winding conductors (103B) in the upper and lower layers to the slots. The equivalent can be understood from the fact that the composite conductors of the commutation winding conductors (103B) and the compensation windings (103A) are distributed along substantially peripheral parts. When the compensation windings are distributed along substantially circumferential parts or completely circumferential parts, the average length of the windings can be shortened in the form of lap windings or concentric windings.

In the case of a wound-rotor type induction machine, the exciting winding function can be given to the primary windings of the wound-rotor type induction machine instead of the DC exciting windings of the synchronous machine shown in FIG. 2(a), (b).

In this case, the secondary windings correspond to the AC windings (101) in the embodiment of FIG. 1.

Referring to FIGS. 2(C$_1$), (C$_2$), the use of the primary windings of the wound-rotor type induction motor as the exciter will be described. In FIGS. 2(C$_1$), (C$_2$), the multi-phase primary windings (110) (the primary windings are wound on the rotor so as to form multi-phases for the secondary windings) are excited by the AC power source (111); for example, as three phase U,V,W. FIG. 2(C$_1$) is a diagram of the spatial distribution of the windings and FIG. 2(C$_2$) is a circuit connection diagram. In the wound-rotor type induction machine, when the current is fed to the AC windings (101) (corresponding to the secondary windings as described), the primary load current overcoming the AC current (corresponding to the load current of the secondary windings) is fed. That is, the current fed to the primary windings counterbalances the current of the AC windings (101) (the electromotive force reaction generated) whereby the primary load current gives the same function as the current compensating the armature reaction of the synchronous machine. Accordingly, the primary windings (110) have the same function as the quadrature-axis exciting windings (103) of the synchronous machine. That is, the wound-rotor type induction machine has suitable characteristics for the application of the present invention because of the stable voltage of the AC windings (101) (the secondary windings) and the stable phases of the secondary internal electromotive force to the secondary current.

Figure 11A:
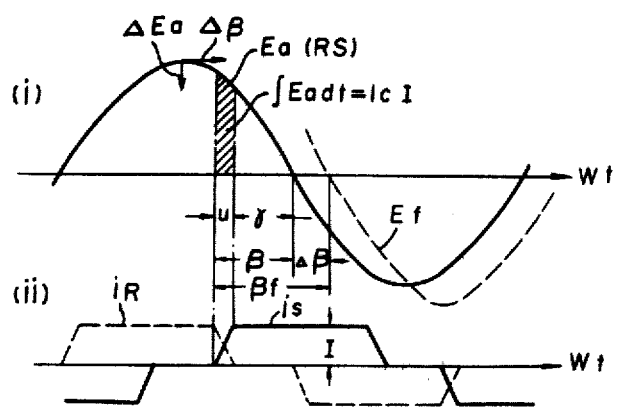
FIGS. 11(*a*) to (*c*) are diagrams for illustrating variations of an absolute value and an allowance angle to phase of an internal electromotive force by an effect of armature reaction.
Figure 11B:
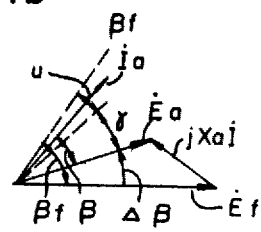

When the exciter is provided, the magnetomotive force of the exciting windings (the field windings (102), (103) of the synchronous machine or the primary windings of the wound-rotor type induction machine) is varied to counterbalance it with the magnetomotive force of the AC windings (101) fed from the electric valve (21). Accordingly, the reduction of the absolute value of the internal electromotive force Ea and the phase shift $\Delta\beta$ described referring to FIGS. 11(a) to (c) are reduced whereby the degree of variation of the overlapping angle U to the load current I is reduced to stabilize the overlapping angle U and the torque pulsation is reduced to attain stable driving operation with a large overlapping angle.

In the case of the synchronous machine, when the current which is proportional to the AC winding current I is fed to the quadrature-axis field windings (103A) or (103B) as in the embodiment of FIGS. 2(a), (b), the counterbalancing magnetomotive force being greater than the magnetomotive force of the AC windings can be given by the quadrature-axis field windings (103A) or (103B).

Figure 11C:
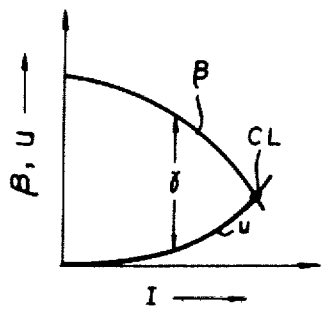
Figure 12A:
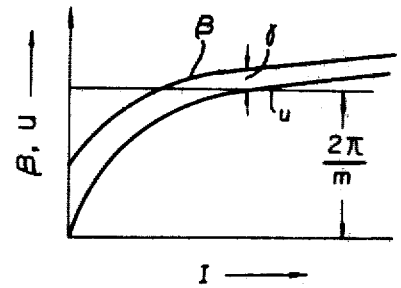
FIG. 12(*a*) is a diagram of curves of variations of a turn-on angle and an overlapping angle obtained by the apparatus of the present invention.

In this case, contrary to the embodiment of FIG. 11(c), it can be set to increase the turn-on angle $\beta$ depending upon the increase of the current value I because the electromotive force component having phase lag of $\pi/2$ from that of the field electromotive force $\dot{E}_f$ can be given by the quadrature-axis field windings (103A) or (103B) in the embodiment of FIG. 11 and the phase difference $\Delta\beta$ can be reverse shifted by the electromotive force component. Accordingly, the curve of variation of the turn-on angle $\beta$ is the saturated curve as shown in FIG. 12(a). On the other hand, the curve of variation of the overlapping angle U is the saturated curve as shown in FIG. 12(a) by the increase of the current value I, the variation of the turn-on angle $\beta$ and the variation of the internal electromotive force (the internal electromotive force absolute value is slightly increased by the greater quadrature-axis field magnetomotive force). As a result, the variation of the allowance angle $\gamma$ is not large and is remarkably stable, and the overlapping angle U is stable for a large angle in the heavy load region (large torque region) whereby the driving operation under a high torque pulsation reducing effect $U \geq 2\pi/m$ can be easily attained. The overlapping angle is large and stable in the region of a large current and a large torque (heavy load region to give a large absolute value of the pulsation torque) whereby the torque pulsation can be reduced (see the description referring to FIG. 3) and the increase of the absolute value of the pulsation torque causing the increase of vibration can be reduced. Thus, the overlapping angle can be stable and the torque pulsation can be reduced by providing the exciting windings for feeding current corresponding to the AC winding current.

In the synchronous machine having the quadrature-axis windings, the large and stable overlapping angle can be given and the allowance angle can be stabilized by the method of the present invention whereby the contradiction of the reduction of the torque pulsation and the stable operation (less commutation failure) can be overcome. Moreover, the torque pulsation can be further reduced because of a small allowance angle (which should be stable and a large overlapping angle. The decrease of the allowance angle γ means to approach the phase of the current $I_a$ to the phase of the internal electromotive force $\dot{E}a$ (see FIG. 11(b)) whereby the power-factor of the motor is improved and the pulsation of momentary power of the sum of the products of the internal electromotive force and the current for each phase (proportional to torque) is reduced and the torque pulsation is reduced. Thus, both the torque pulsation reducing effect caused by the decrease of the allowance angle and the torque pulsation reducing effect caused by the increase of the overlapping angle can be obtained.

In the synchronous machine, when the distribution region width $\theta_F$ of the direct-axis field winding conductors (102F) is smaller than the electrical angle of $\pi/2$ by using the exciter having substantially cylindrical sectional view shown in FIG. 2(a), (b), the distribution of space magnetic flux density is a trapezoidal waveform. Moreover, when the numbers of phases of the AC windings (armature windings) are large, the distribution region width of the windings for one phase can be narrow whereby the field electromotive force waveform for one phase is substantially a trapezoidal waveform as the electromotive force $E_f$ in FIG. 12(b). Accordingly, the torque waveform for one phase becomes flat the composite torque pulsation for all phases can be reduced. Moreover, the maximum flat range of the space magnetic flux density is broadened and the average magnetic flux density in the total space range is increased to contribute to the compact structure of the motor.

Figure 12B:
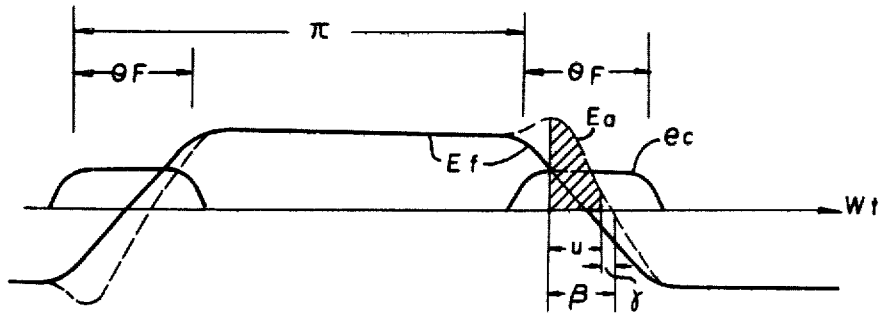

When either of the second quadrature-axis windings (the commutation coil (103B) in FIG. 2(a)) or the quadrature-axis windings distributed around the circumference ($\overline{103}$ in FIG. 2(b)) is provided, the commutation magnetic flux can be given in the distribution region of the field winding conductors (102F) whereby the commutation electromotive force $e_c$ can be generated in the time section for the commutation period by the commutation magnetic flux as the commutation electromotive force $e_c$ in FIG. 12(b). Accordingly, the composite electromotive force Ea is shown by the dotted line. The commutation is caused in the time section shown by the dotted line under overlapping. Thus, the commutation section can be reduced whereby both of the torque pulsation reducing effect caused by stabilizing the overlapping angle U and the allowance angle γ and the torque pulsation reducing effect caused by increasing the flat width of the peak value of the electromotive force waveform can be attained and the compact structure of the motor caused by increasing the effective torque generation region can be attained.

Figure 4:
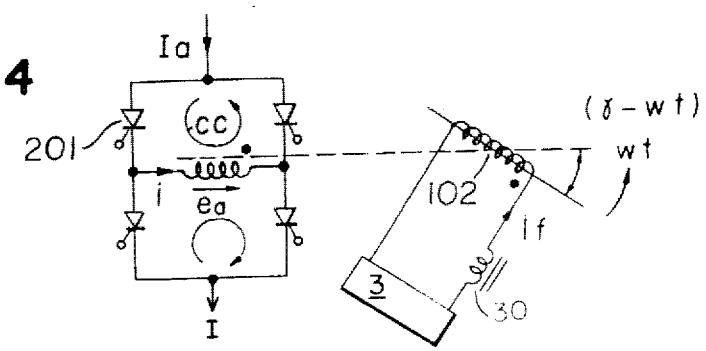
FIG. 4 is a connection diagram for illustrating the functional relations between the AC windings and the field windings.

In the embodiment of FIG. 2(a), (b), when the direct-axis field windings (102F) are provided in the opposite space side (the bottom of the slots) to the quadrature-axis field windings (103), the degree surrounding the conductors of the field windings by the magnetic core teeth is increased to increase the leakage inductance whereby the equivalent function and effect to the embodiment having the series inductances (30) in the field windings can be attained as the embodiment of FIG. 4. As a result, the characteristic curve of the current I to the overlapping angle U shown in FIG. 12(a) can be given because the high impedance field circuit for current source is considered as the AC current source from the viewpoint of the armature and the commutation circuit in the commutation and it has the function as the commutation circuit connected to the AC current source (high impedance AC power source).

The above-mentioned third and fourth in the five fundamental methods will be illustrated.

The third and fourth methods are respectively to increase the commutation overlapping angle.

The circuit diagram for the operation is shown in FIG. 4. FIG. 4 is a circuit diagram showing the spatial relationship between the AC windings and the field windings in the commutation, that is, the magnetic coupling relationship wherein the reference CC designates the commutation loop; (γ−ωt) designates the instantaneous magnetic axial angle (absolute value is decreasing). In the coupling relationship, the AC winding transient inductance becomes large to increase the overlapping angle even though the field winding closed circuit inductance is large or the AC winding circuit inductance is large. The increase of the overlapping angle does not cause commutation failure but it is compensated by the compensation windings (103A), (103B), (110) thereby being rather advantageous for stabilization in the region of the large overlapping angle (relative reliable allowance) because a small compensation error (error of commutation magnetic flux) appears at a relatively high ratio for a small overlapping angle (that is small commutation inductance) and the fluctuation of the overlapping angle is sensitive and is unstable. The relationship has not been known. The principle of the relationship is not simple and it will not be described in detail as it requires not only an understanding of the principle of the conventional rectifier circuit but also the principle of internal phenomena of the rotary machine.

The following facts are emphasized. In the embodiment of the present invention, a theoretical effect which is contary to the conventional consideration for decreasing the overlapping angle is considered. In the case of the conventional low leakage inductance, it is too sensitive to excess or deficiency of compensation whereby it causes an instability for the approach to the object of the invention (approach or excess the critical overlapping angle).

From fundamental considerations of the phenomenon that the commutation is performed by exchanging the magnetic fluxes in the closed circuit without the conventional consideration of the commutation phenomenon that the commutation is caused by the internal electromotive force, the absolute value of the compensation magnetic flux is increased depending upon the increase of the magnetic flux being compensated (AC winding leakage magnetic flux) whereby the sensitivity to excess of deficiency of the magnetic flux is lowered and it is relatively stabilized. (As the base of the relative object, the field magnetic flux is considered).

The phenomenon can be considered from these considerations.

The fifth method providing the damper windings will be illustrated.

The damper (105) in the fifth method causes a reduction in the commutation transient reactance to decrease the overlapping angle. This seems to be opposite to the reasons of the third and fourth methods. However, the fundamental phenomenon is an exchange of the magnetic flux. The damper affects only the transient impedance and does not affect the excess or deficiency of the compensation magnetic flux. That is, it does not substantially affect the required compensation magnetic flux. Accordingly the sensitivity to excess or deficiency of the compensation is not affected.

The damper (105) is provided to reduce the mutual commutation interference caused by the magnetic coupling electromotive force (transformer action) to the other phase during the time of commutating in one phase, whereby the commutation in each phase is improved in single phase and independent condition. Thus, the independency of the phases is improved, and the commutation overlapping angle in each phase is increased as in the single phase commutation phenomenon. The percent leakage of the armature can be increased to increase the electric loads and the output coefficient of the motor (propulsion per unit faced space area) is improved.

The function and results of the invention have been illustrated referring to FIG. 2 illustrating an embodiment of the motor and FIG. 1 illustrating an embodiment of the circuit.

The other embodiments will be described in detail.

FIGS. 5 and 6 are respectively circuit diagrams of the other embodiments of the invention. FIG. 5 shows an embodiment of five phase ring connected AC windings and FIG. 6 shows an embodiment of seven phase ring connected AC windings.

In FIG. 5(a), the quadrature-axis exciting windings (103) and the series direct-axis exciting windings (102b) are connected in series to the DC input circuit and the quadrature-axis exciting windings (103) have connection polarity commutating means (5) depending upon the polarity of the torque. The series direct-axis exciting windings (102b) is combined with the quadrature-axis exciting windings to impart compensation such as for the armature reaction. The erroneous angle between the compensation winding axis and the armature current magnetic axis is compensated by the exciting winding (102b) in the operation under gain of the turn-on control angle of the electric valve circuit (21) from the electromotive force caused by the direct-axis excitation.

Figure 13:
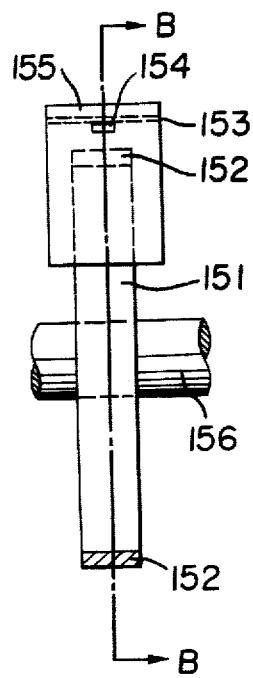
FIGS. 13(*a*) to 13(*c*) are diagrams illustrating a preferred embodiment of a rotation position detector.
Figure 13B:
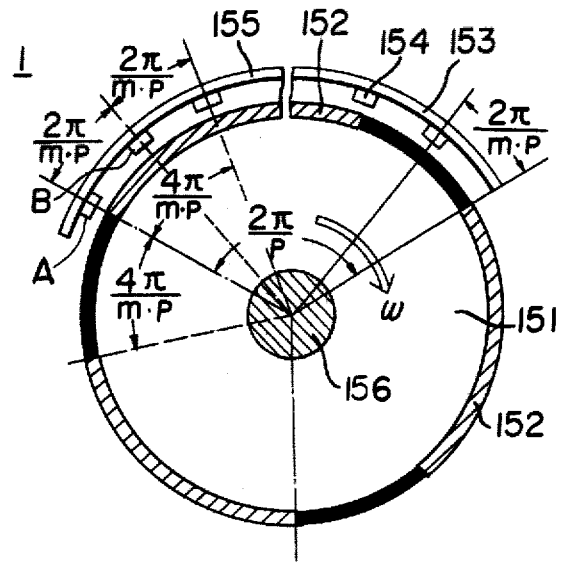
Figure 13:
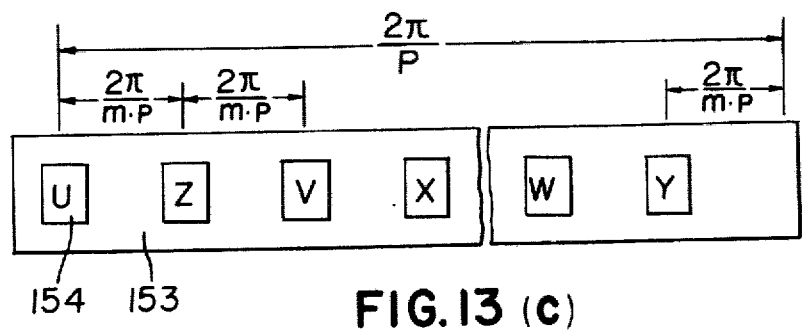

The rotation position detector (1) and the turn-on control means will be illustrated as follows. As shown in FIG. 13 the rotation position detector (1) comprises a rotor shaft (156) of a rotor; a rotor disc (151) fitted to the rotor shaft (156); a plurality of flexible permanent magnets bonded on the peripheral surface of the rotor disc (151). The magnets are magnetized to have different polarities shown by the black parts and the shading parts; a flexible substrate (153) which is held by a fitting means around the flexible permanent magnets with a suitable gap; magnetic induction elements (154) as hole elements formed on the flexible substrate (153) in the peripheral direction with each having a predetermined gap; a platy magnetic substance (155) curved along the flexible substrate (153) so as to effectively use magnetic flux in the space between the flexible substrate (153) and the flexible permanent magnet (152). The magnetic substance (155) is formed in an arc shape having a central angle of slightly greater than $2\pi/p$ (p is a number of pair poles: p=5 (10 poles)) at the end in the axial direction as shown in FIG. 13(b). The phase difference of the output signals from the magnetic induction elements (154) is a mechanical angle of $2\pi/\text{m·p}$ (m is a number of the magnetic induction elements (154):(m=6). That is, the electric angle of $2\pi/m$ is given. In FIG. 13, $\omega$ designates a rotation angle velocity in the direction of the arrow.

FIG. 13(c) shows plane view of the flexible substrate (153) shown in FIGS. 13(a), (b). As shown in FIG. 13(c), m of the magnetic induction elements (154) are placed on the flexible substrate (153) with each gap of $2\pi/\text{m.p}$.

The operation of the device will be illustrated as follows. The rotor disc (151) is rotated at an angle velocity of $\omega$. The flexible permanent magnets (152) are magnetized so that the magnetic induction elements (154) generate signals when the black part of the flexible permanent magnet (152) passes near the magnetic induction element (154). Thus, the output signal of the magnetic induction elements (154) at this time in the case shown by FIG. 13(c), has $4\pi/\text{m.p}$ (as mechanical angle) of the period of the output signal of the magnetic induction element (154) and $2\pi/\text{m.p}$ (as mechanical angle) of the phase difference which respectively corresponds to $4\pi/m$ of the period and $2\pi/m$ of the phase difference as an electric angle.

In FIG. 13, the output signal of the magnetic induction element (154) has $4\pi/m$ of the period and $2\pi/m$ of the phase difference as an electric angle. Thus, if desired, the period of the output signal can be varied by varying the magnetized widths of the magnets.

The rotation position detector (1) can be formed in the case of the seven phases shown in FIG. 6.

Figure 5C:
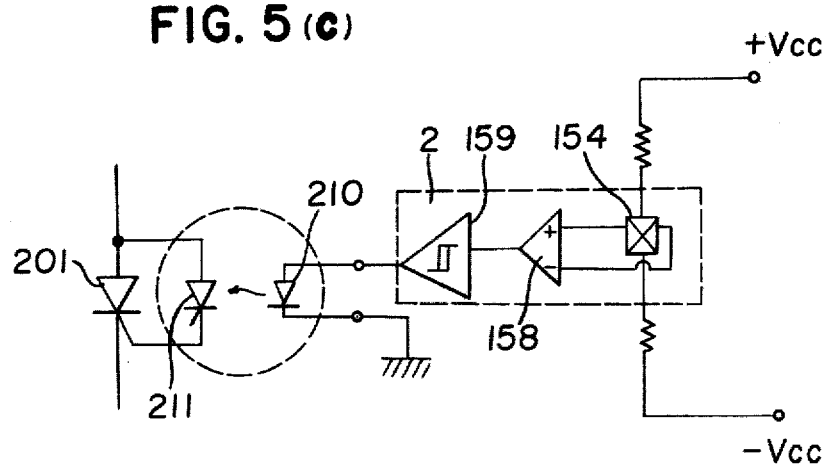

Referring to FIG. 5(c) the relation of the output of the magnetic induction elements (154) as hole elements and the turn-on of the thyristor (turn-on control means) (21) will be illustrated.

The output of the hole element (154) is fed to the differential amplifier (158) and the output is fed into the comparator (159). A light emission diode (210) and a photothyristor (211) are connected to the output side of the comparator (159). The output of the photothyristor (211) is fed to the gate of the main thyristor (201). The photocoupling device, comprising the light emission diode (210) and the photothyristor (211), is connected to each main thyristor (201). The distributing part (turn-on control means) (2), comprising the hole element (154), the differential amplifier (158), and the comparator (159), is connected to each main thyristor (201).

In the case of FIG. 5, ten of the distributing parts (2) (for five phases) are placed at the peripheral part of the flexible substrate (153).

In order to perform the regenerative braking and the reversible driving, it is formed to be switchable of the turn-on phase angle $\beta$. In this case, the total number of the distributing parts (2) are equal to the product of the number of the thyristors (201) and the steps of switching of the turn-on phase angle $\beta$.

The turn-on operation of the system will be briefly illustrated as follows. The differential amplifier (158) and the comparator (159) are operated depending upon the output of the hole element (154) of the rotation position detector (1) whereby the main thyristors (21) corresponding to the specific hole element (154) are sequentially turned on.

FIG. 6 is the circuit diagram of an embodiment comprising the armature current detector (6) and the control field exciting means (3) for the field current responding to the output of the detector (6) (the functional curves shown by the full line or the dotted line in the proportional straight line $I_f = \sqrt{I^2_{fo} + (k_1 I_a)^2}$; $I_{fo}$ = fixed value; $k_1$ = constant.

In the case of the functional curve responding excitation, the turn-on phase control means (7) is connected between the distributor (1) and the turn-on control means (2). The angle function is:

$$\Delta\theta = \tan^{-1}\frac{k_2 I_2}{I_{fo}}, k_2 \approx k_1$$

The feature imparts the same effect as having the compensation windings.

In another embodiment, the independent series field windings can be used for compensation to impart a remarkable effect for stabilization of the overlapping angle.

Figure 5B:
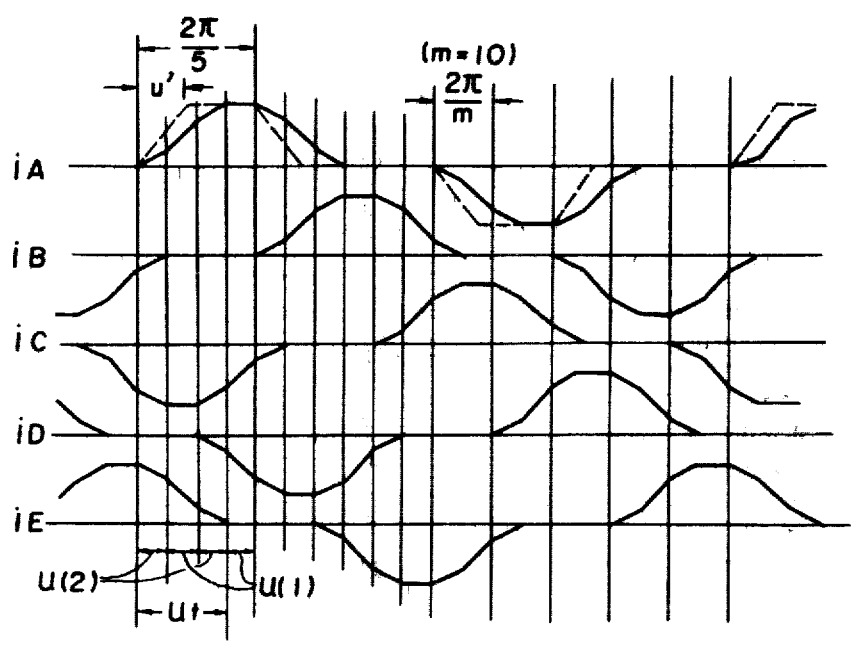

The current waveforms given by the embodiments of FIG. 5(a) and FIG. 6(a) are shown in FIGS. 5(b) and FIG. 6(b). The positive half-wave is given by the electric valves on the positive side and the negative half-wave is given by the electric valves on the negative side. The full line shows the overlapping commutation condition (U>2π/m) and the dotted line shows the non-overlapping commutation condition (π/m<U'<2/m).

Figure 7A:
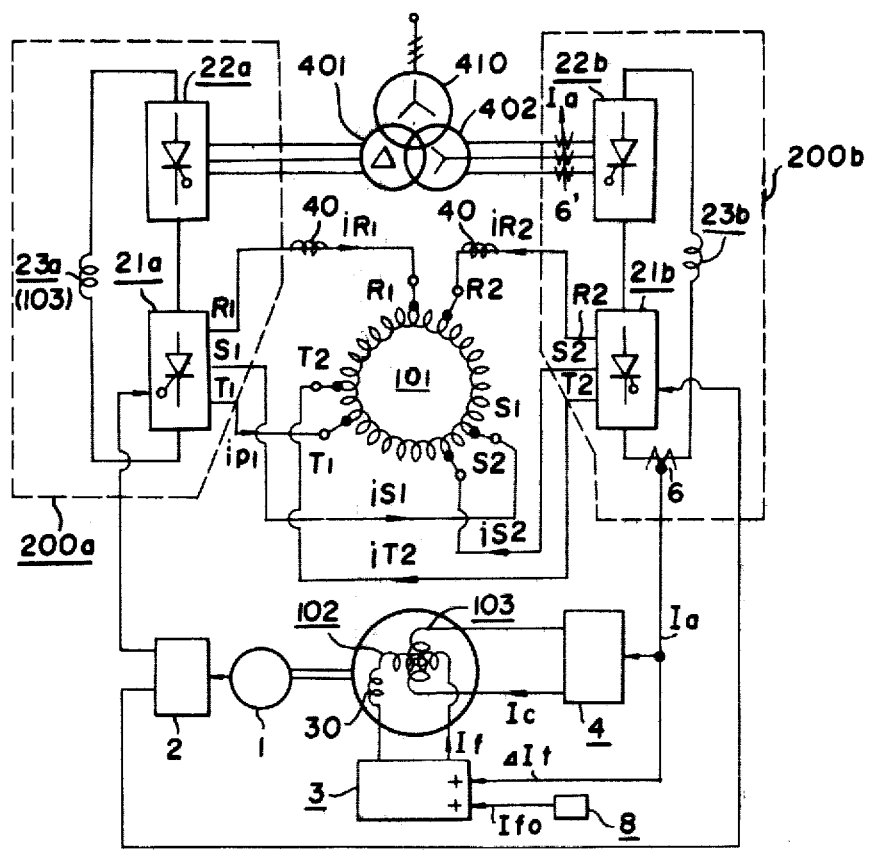

FIG. 7(a) shows one embodiment of the three phase multielectric valve circuit connection which comprises the first three phase group $R_1$, $S_1$, $T_1$ and the second three phase group $R_2$, $S_2$, $T_2$. The phase difference between the groups is 30 degrees of the electrical angle, and the composite commutation times per cycle is m=12.

In FIG. 7(a), the non-insulated armature windings having ring connection taps is shown. Thus, it can be the AC windings which are insulated. The frequency changers (200a), (200b) are provided in each group and they are connected to the secondary windings (401), (402) of the AC power source transformer. The frequency changer can be the combination of the rectifier (22) and the inverter (21) as well as the cycloconverter.

Figure 8A:
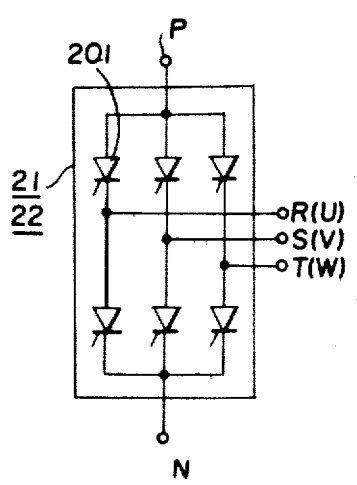
FIGS. 8(*a*), (*b*) are respectively partial detailed connection diagrams of FIG. 7.
Figure 8B:
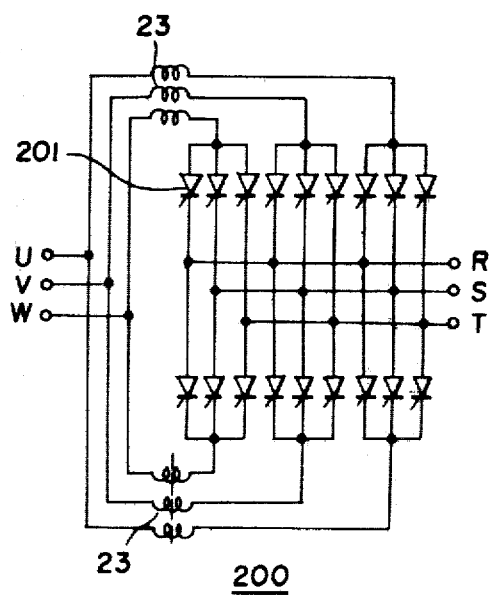
Figure 9:
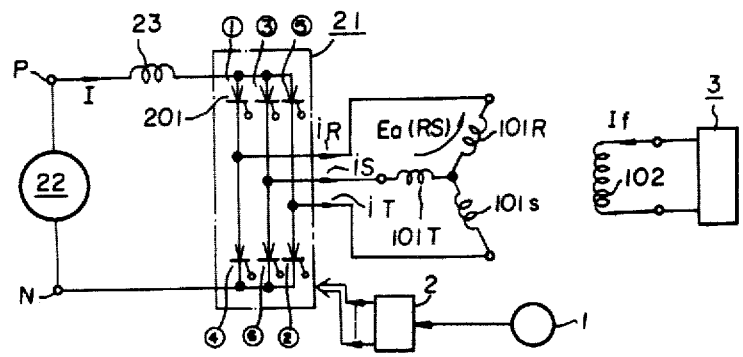
FIG. 9 is a circuit connection of the conventional apparatus.
Figure 10:
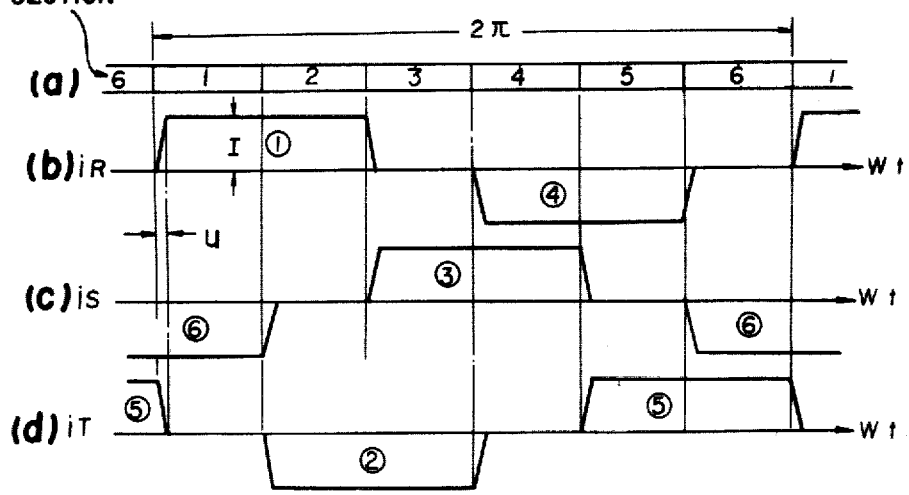
FIGS. 10(*a*) to (*d*) are diagrams for illustrating the commutation of the electric valve circuit in the conventional apparatus.

The connection of the rectifier (22) and the inverter (21) is shown in FIG. 8(a) and the cycloconverter as the frequency changer (200) is shown in FIG. 8(b).

In the embodiment of FIG. 7(a), the similar function and result of the biaxial series compensation winding method of FIG. 5(a) can be attained by the control excitation.

The embodiment comprises the control compensation exciting means (4) which inputs the output $I_a$ of the current detector (6) or (6') to feed the quadrature-axis excitation current $I_C$; and the control field exciting means (3) which feeds the direct-axis field current $I_f$ ($I_f = I_{fo} + \Delta I_f = I_{fo} + kI_a$) corresponding to the sum of the fixed component field current $I_{fo}$ and the armature current proportional component $\Delta I_f$. Thus, the series components are respectively given to the biaxial excitation so as to attain the composite compensation.

Figure 7B:
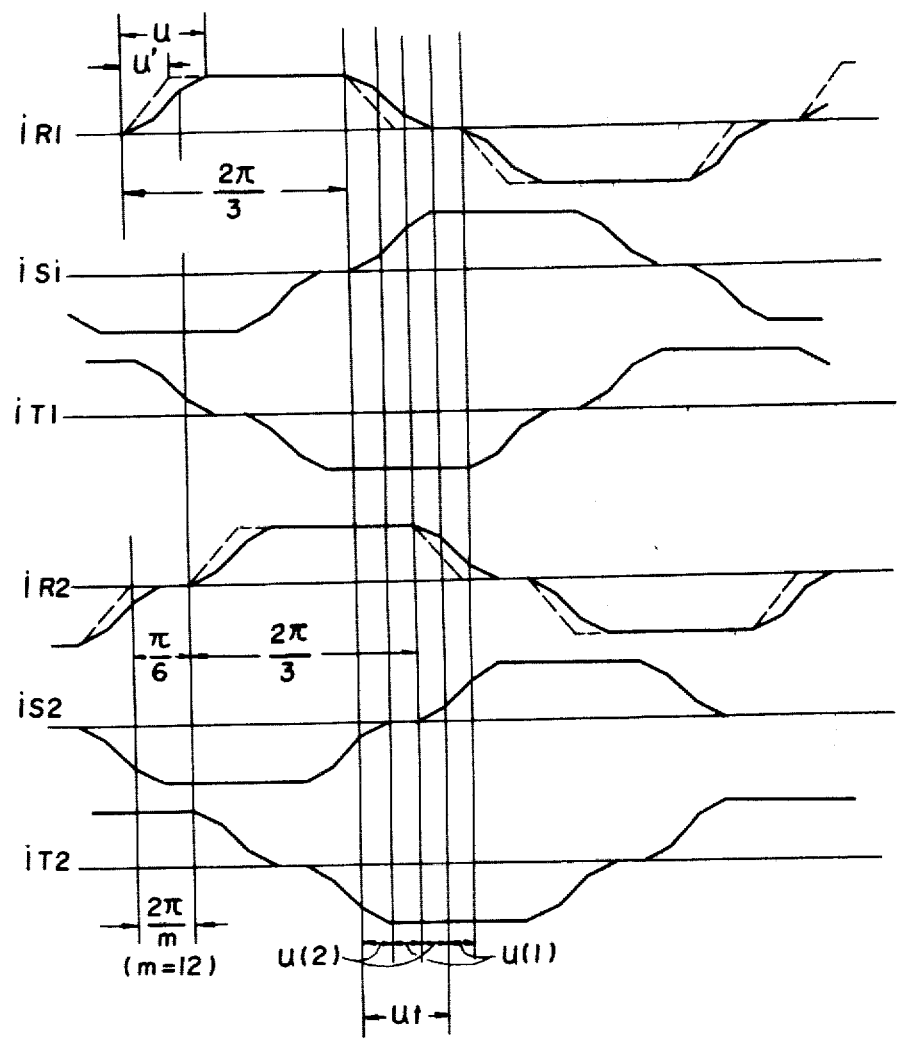

The line curent waveforms in the phases are shown in FIG. 7(b), wherein the full line shows the overlapping commutation condition (U>2π/m) and the dotted line (R phase only) shows the non-overlapping commutation condition (π/m<U'<2π/m), U(1) designates 1 loop commutation region and U(2) designates 2 loop commutation region.

It is possible to carry out the invention with various embodiments of the multi-phase electric valve circuits. For example, in FIG. 1, the inverter units (21) to (21g) can be replaced by multi-phase inverter units (FIGS. 5, 6 and 8(a)).

The multi-phase embodiments are effective for stable operation in the approach to the critical overlapping angle condition and the super-critical overlapping angle operation and also effective for reducing the torque pulsation together with the effect for reducing the torque pulsation by the increase of the communication times.

In accordance with the present invention, the effect for reducing the torque pulsation can be attained by operating under the condition of the commutation overlapping angle of the electric valves U being higher than π/m preferably near 2π/m, wherein the reference m designates the commutation times per cycle of the electric valve circuit in the motor driving system comprising the AC motor having internal electromotive force and the electric valve circuit which is commutated by the internal electromotive force to feed it to the AC windings.

In the synchronous motor, the stable operation is attained by providing the DC windings which is excited by DC current corresponding to the armature current.

The stable operation can be attained by providing more than eight of the commutation times per cycle.

The operation can be easily attained by providing the single phase feeding unit in each phase.

In the embodiments described the stable operation can be also attained.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric valve-feeding motor apparatus commutated with internal electromotive force which comprises:
   an AC motor having AC windings which generate an internal electromotive force;
   an electric valve circuit for feeding current to the AC windings; and
   means for commutating the electric valves in the electric valve circuit by the internal electromotive force of the AC windings under the driving condition of U>π/m wherein m designates the commutation times per one AC cycle of the electric valve circuit and U designates a commutation overlapping angle of the electric valves.

2. A motor apparatus according to claim 1 wherein m is more than 8.

3. A motor apparatus according to claim 2 wherein the motor is a synchronous motor having field windings and including a DC reactor connected in series with the field windings.

4. A motor apparatus according to claim 2 wherein the motor is a synchronous motor which comprises DC windings excited by DC current having a component being proportional to the feeding current to the AC windings.

5. A motor apparatus according to claim 4 wherein the operation is under the condition of U>2π/m.

6. A motor apparatus according to claim 4 wherein the synchronous motor includes damper windings for reducing commutation transient reactance to decrease the commutation overlapping angle of the electric valves.

7. A motor apparatus according to claim wherein the electric valve circuit comprises a plurality of single phase feeding units corresponding to the phases of the AC windings and the AC windings are fed from the single phase feeding units.

8. A motor apparatus according to claim 7 wherein the AC windings have even phase numbers G being more than 4 phases and the phases have each a phase difference of $\pi/G$ or an integer times of $\pi/G$.

9. A motor apparatus according to claim 7 wherein the single phase feeding units each comprise a single phase bridge inverter and the DC input terminals of the inverter units are connected in series.

10. A motor apparatus according to claim 1 wherein the commutating means variably controls the turn-on phase of each electric valve depending upon the current fed to the AC windings.

11. A motor apparatus according to claim 1 wherein the AC motor is a synchronous machine and the AC windings are armature windings of the synchronous machine and including direct-axis field windings and quadrature-axis exciting windings, the quadrature-axis exciting windings being imparted with excitation current corresponding to the armature winding current and the direct-axis field windings being excited by DC current.

12. A motor apparatus according to claim 11 wherein an armture current proportional component is fed to the direct-axis field windings.

13. A motor apparatus according to claim 11 wherein the direct-axis field windings are disposed at a position being deeper than the depth of the quadrature-axis exciting windings in slots in the armature.

14. A motor apparatus according to claim 11 wherein the conductors of the quadrature-axis exciting windings are distributed along a circumferential part of the armature.

15. A motor apparatus according to claim 11 wherein the quadrature-axis field windings comprise long pitch windings and short pitch windings.

16. An AC motor drive system comprising:
an AC motor having AC windings, and at least one exciting winding for providing magnetic flux to said AC windings through the air gap of the AC motor itself;
exciting means for feeding exciting current to said exciting winding;
a power converter for feeding AC current to said AC windings, said power converter comprising at least a number m of controlled electric valves, m being an integer equal to 8 or more;
means for proportionately increasing the magnetomotive force generated by the one or several of said exciting windings in response to increasing of the AC current fed to said AC windings;
turn-on control means for firing said number m of controlled electric valves, the valves being fired with firing electrical angles that are respectively different from each other; and
means for commutating said number m of controlled electric valves by the internal electro-motive forces of said AC windings.

17. An AC motor drive system according to claim 16, including:

a DC reactor through which the field winding of said exciting windings is connected to a DC exciting source of said exciting means.

18. An AC motor drive system according to claim 16 wherein said exciting windings include:
a DC exciting winding excited by DC current having a component proportional to the AC currents fed to said AC windings.

19. An AC motor drive system according to claim 18 wherein:
the commutation overlapping electrical angle U of said electric valves is more than $\pi/m$.

20. An AC motor drive system according to claim 18 wherein said AC motor includes:
a rotor on which said DC exciting winding is disposed; and
a damper winding disposed around the rotor of said AC motor.

21. An AC motor drive system according to claim 16 wherein:
said power converter consists of single phase feeding units whose number corresponds to the numbers of the phases of said AC windings; and
each phase of said AC windings is fed from each phase unit of said single phase feeding units.

22. An AC motor drive system according to claim 21 wherein:
said AC windings have even phase numbers G being equal to four or more phases; and
said phases of said AC winding each have an electrical phase difference of $\pi/G$ of an integer times $\pi/G$.

23. An AC motor drive system according to claim 21 wherein:
each phase unit of said single phase feeding units is a single phase bridge inverter; and
DC input terminals of said single phase bridge inverters are respectively connected in series for passing a common DC input current.

24. An AC motor drive system according to claim 16 wherein:
said firing electrical angles of said controlled electric valves are adjustably controlled in response to variation of said AC current fed to said AC windings.

25. An AC motor drive system according to claim 16 wherein said exciting windings include:
a direct-axis field winding excited by one DC current; and
a quadrature-axis exciting winding excited by another DC current corresponding to said AC current fed to said AC windings.

26. An AC motor drive system according to claim 25 wherein said exciting means includes:
adjustable exciting means for feeding to said direct-axis field winding said DC current proportional to said AC current fed to said AC windings.

27. An AC motor drive system according to claim 25 wherein said exciting windings include:
an auxiliary direct-axis field winding excited by DC current corresponding to said AC currents fed to said armature windings.

28. An AC motor drive system according to claim 25 wherein:
said direct-axis field winding is disposed at a position deeper than the depth of said quadrature-axis exciting winding in slots of said exciting windings.

29. An AC motor drive system according to claim 25 wherein:

the conductors of said quadrature-axis exciting winding are distributed around the whole circumferential part which is exposed to the air gap of said AC motor.

30. An AC motor drive system according to claim 25 wherein said quadrature-axis exciting winding consists of:

long electrical pitch coils and short electrical pitch coils.

31. An AC motor drive system according to claim 25 wherein said exciting windings consist of:

primary poly-phase windings excited by a poly-phase AC power source.

* * * * *